United States Patent [19]

Faucillon

[11] Patent Number: 4,486,973

[45] Date of Patent: Dec. 11, 1984

[54] SHELLFISH TRAPS

[75] Inventor: Michel Faucillon, Baillet En France, France

[73] Assignee: Allibert S.A., Grenoble, France

[21] Appl. No.: 394,589

[22] Filed: Jul. 2, 1982

[30] Foreign Application Priority Data

Jul. 3, 1981 [FR] France .................. 81 13142

[51] Int. Cl.³ .............................. A01K 69/08
[52] U.S. Cl. ........................ 43/100; 43/103; 43/105
[58] Field of Search ............... 43/100, 102, 103, 104, 43/105

[56] References Cited

U.S. PATENT DOCUMENTS 3,708,905  1/1973  Jalbert ................... 43/100
3,992,804  11/1976  Senese ................... 43/100

FOREIGN PATENT DOCUMENTS 1080705  12/1954  France ................... 43/102
2398454  2/1979   France .
7370345  10/1974  United Kingdom ......... 43/100

Primary Examiner—Nicholas P. Godici
Assistant Examiner—Kurt Rowan
Attorney, Agent, or Firm—Pollock, VandeSande & Priddy

[57] ABSTRACT

The invention relates to improvements in shellfish traps. According to the invention, the trap consists of a bottom 1 weighted with concrete blocks 19 onto which is fastened a cage 2 provided with a truncated entrance opening 7. Means 8 are provided on the bottom and cooperate with opening 7 to facilitate the stacking of traps one upon the other.

The invention is applied particularly to shellfish fishing.

6 Claims, 6 Drawing Figures

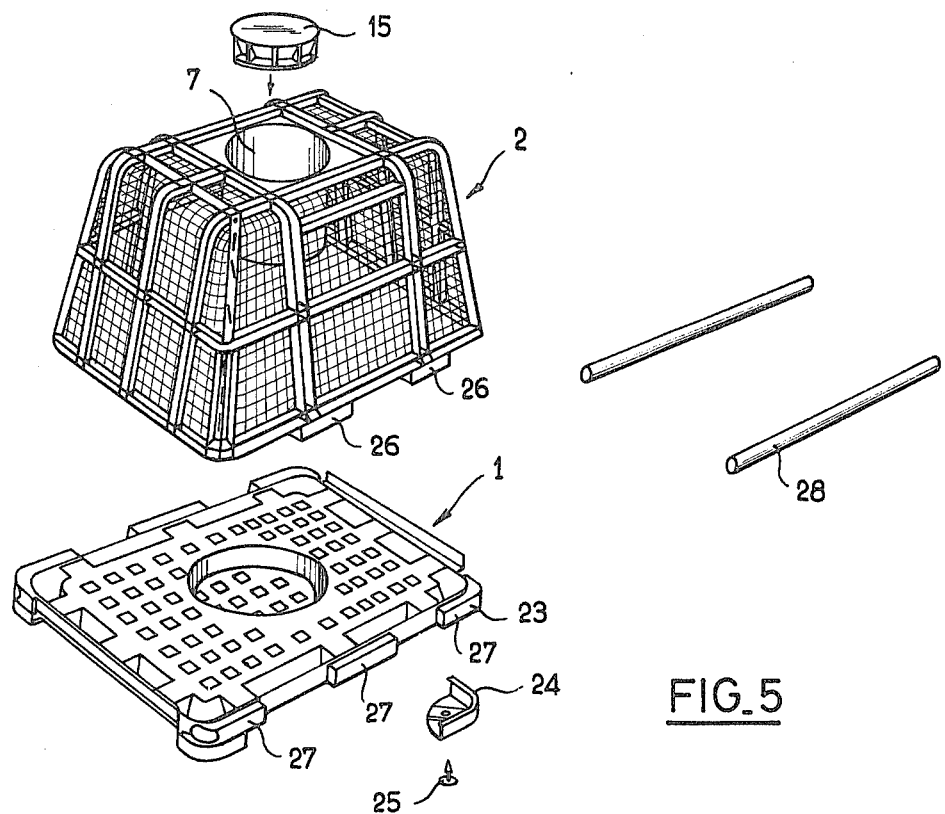
FIG_5
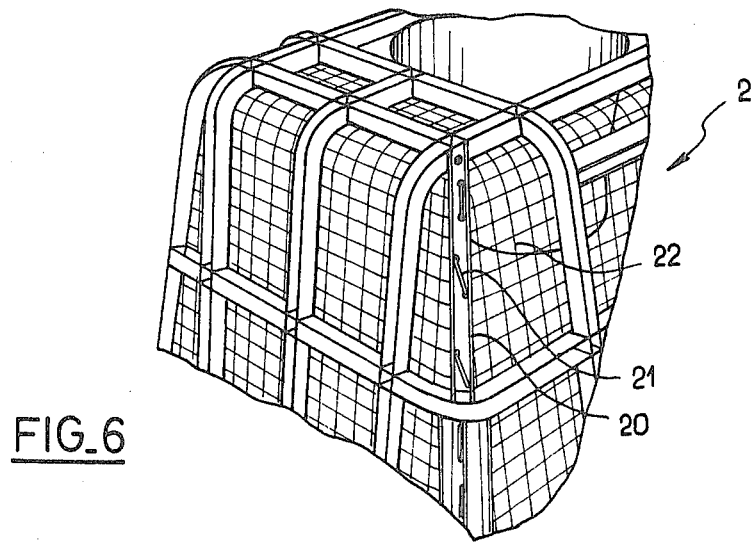
FIG_6

SHELLFISH TRAPS

This invention relates to improvements in traps for shellfish.

Shellfish traps have been known for a long time, appearing in the shape of a mesh basket having a truncated opening through which shellfish enter the basket in order to reach the bait which has been set there. Once in, the shellfish cannot find their way out, because of the spatial positioning of the exit and its truncated shape, by virtue of which the diameter of the exit is smaller than that of the entrance. Previously, the frames of such traps were made of wood, e.g., wicker, or of metal. Such constructions are fragile and difficult to maintain.

More recently, traps modeled after the old, existing designs have been proposed, in which plastic materials have replaced the wood or metal. Such racks are more resistant, but their overall design is generally unsuitable, and they have various drawbacks when put to use.

This invention relates to improvements made to traps while making full use of the qualities of plastic materials.

A trap according to the invention, of the type comprising a ballasted bottom onto which is mounted a removable (e.g., hinged) cage with an essentially truncated opening through which the shellfish enter and onto which a net is fastened, is particularly characterized under the invention in that its bottom comprises a hollow section near its center forming a protrusion with respect to the main central surface of the bottom, the dimensions of which correspond essentially to the diameter of the entrance opening, thus assuring the stability of a stack of racks placed one on top of the other.

According to another characteristic of the invention, around the circumference of the bottom are located two ridges spaced slightly apart, between which containers are arranged with holes on top and underneath, into which concrete or other like ballast may be poured.

With such a design, the racks are very stable when placed in fishing grounds, with the concrete ballast lending enough weight to the racks and lowering the center of gravity as much as possible, which is a guarantee of stability. In addition, the ballast makes for non-wearing and non-skidding bases. When empty, the racks can be easily stacked with the help of the partial interlocking of the bottoms with the upper parts of the cages.

According to another characteristic of the invention, a reducer cone is set into the opening of the cage by clasps or by force fit, with said cone being formed with one surface having two truncated cones, the smaller diameter of which is slightly less than the diameter of the opening, and the larger diameter slightly greater than the diameter of the opening. In this way, the trap can be adapted with one motion to the type of shellfish being sought, with the reducer cone fitting simply into place within the truncated entrance of the cage and being similarly removable by continuing to push the reducer cone in beyond the working position of the reducer.

The application and advantages of the invention appear more clearly in the following detailed description made with reference to the attached drawings showing a sample embodiment.

In these drawings:

FIG. 2A is a partial sectional view of two stacked traps having nesting portions.

FIG. 5 is an exploded view of a variant, in perspective; and

FIG. 6 shows in larger scale a detail of the trap shown in FIG. 5.

Figure 1:
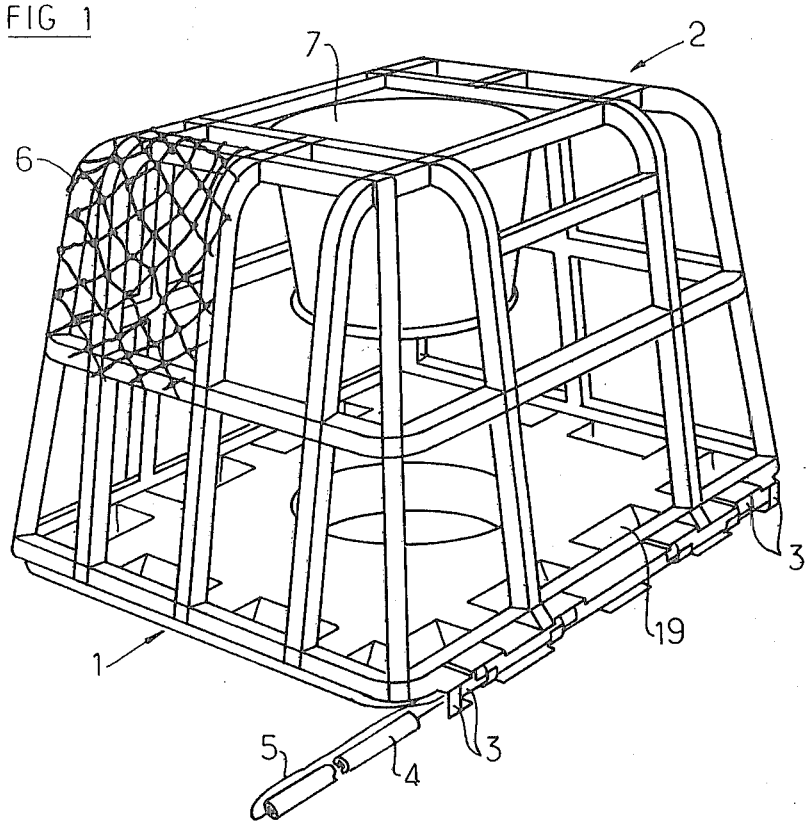
FIG. 1 is a schematic perspective view showing a trap as conceived under the invention.

According to the embodiment shown in the drawings, the trap comprises essentially a bottom 1 onto which is mounted a cage 2. Cage and bottom are joined in a removable manner, e.g., by means of hinges 3 integral with the bottom and the cage, and pins 4 insertable into these hinges. In the example shown in FIG. 1, pin 4 is hollow and holds a string or other flexible link 5 enabling the insertion and removal of the pin without it being lost. Link 5 is attached to bottom 1. Onto cage 2 is fastened a net 6, the mesh of which is adapted to the type of fishing in question. On top of the cage, a truncated opening 7 is fashioned, through which shellfish enter, lured by a piece of bait placed in the bottom, e.g., in the center, hollow section 8 of the bottom. Hollow section 8 protrudes, as shown in FIG. 2A, with respect to plane 9 of the main center surface of bottom 1. Its dimensions correspond essentially to the diameter of entrance opening 7, so that the traps can be placed, in nesting relation, on top of each other in stable stacks, with section 8 protruding from the rack above into opening 7 of the rack immediately below, as shown in FIG. 2A.

Figure 2:
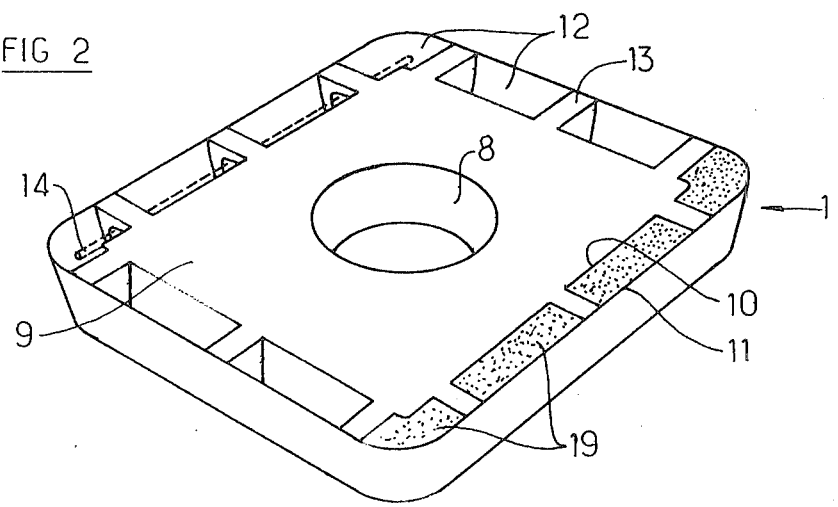
FIG. 2 shows, in top-view, how the bottom of the trap is shaped.

As appears more clearly in FIG. 2, the circumference of the bottom comprises two ridges 10, 11 between which containers are arranged into which concrete blocks 19 can be poured, thereby constituting the ballast of the trap. Openings such as 12 are made on top in order to facilitate the pouring of the concrete, while concrete is also retained in passages, the passages formed in bridge separators 13 which form connecting bridges between the upper ribs of ridges 10, 11. Thus under the rack and at right angles with bridges 13 concrete bases or feet are formed, preventing the rack's supporting surface from wearing out prematurely.

Metal reinforcements such as shown in 14 are advantageously placed inside the containers, between ridges 10, 11, before pouring the concrete, thus reinforcing the structure.

Figure 3:
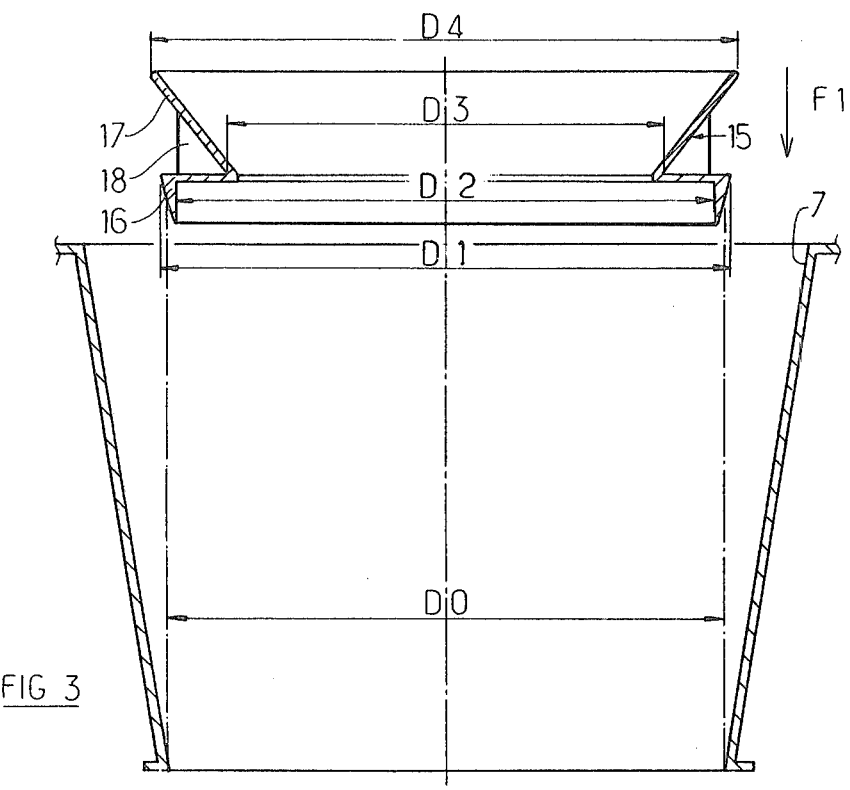
FIGS. 3 and 4 are cross-sections showing the positioning of the reducer-cone.
Figure 4:
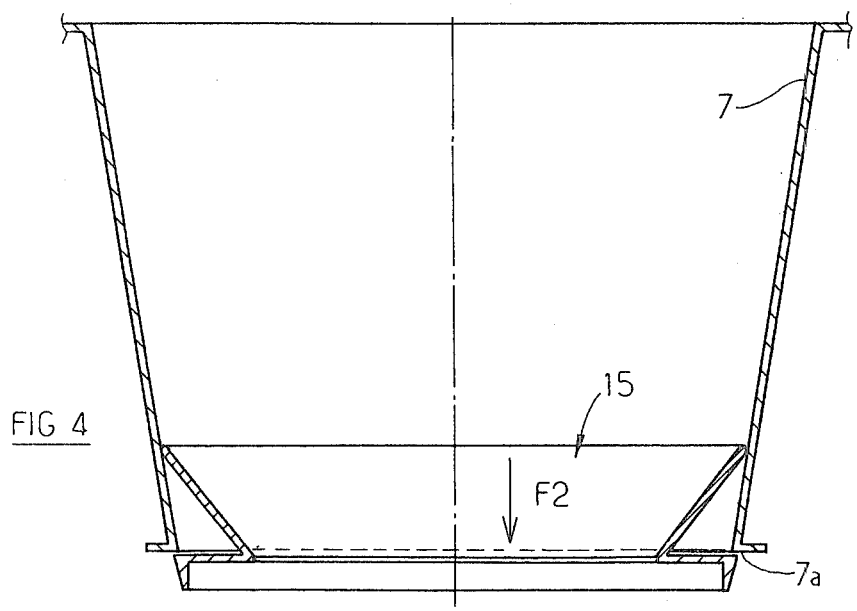

To enable adaptation of the trap described to the characteristics of the fishing being undertaken, as shown more clearly in FIGS. 3 and 4, a reducer-cone 15 is provided and fitted over truncated opening 7 of the cage.

To facilitate its positioning and retention over opening 7, the surface of reducer 15 is shaped in such a way as to have two truncated cones, 16 and 17, oriented in the same direction. The small, outer diameters D3 and D2 of truncated cones 16 and 17 are slightly smaller than the small diameter Do of opening 7. Similarly, the large diameters D1 and D4 of truncated cones 16 and 17 are slightly greater than diameter Do.

Under these conditions, positioning reducer 15 requires no more than inserting it by pushing in the direction of arrow F1, as shown in FIG. 3 over opening 7, into the opening until, as shown in FIG. 4, lower edge 7a of opening 7 engages into the space between truncated cones 16, 17. If the reducer is to be removed, this can be done by continuing to insert it in the same direction, as shown by arrow F2 in FIG. 4, by working with the elasticity of the plastic material constituting opening 7 and reducer-cone 15. At 18 appear small reinforcing tongues recessed slightly from diameter Do of opening 7 and joining cones 16, 17 of reducer 15 in order to make this part highly resistant.

According to the variant shown in FIGS. 5 and 6, cage 2 consists of essentially U-shaped molded plastic sections appearing more clearly in FIG. 6. While providing for a rigid structure, this enables wire 21 by which net 22 (replacing net 6 from the embodiment shown in FIG. 1) is attached to the inside of the cage to be protected within the section, as appears more clearly in the corner section marked 20 in FIG. 6. In this way, the net is also protected inside the cage and therefore has less chance of tearing or wearing out. Under such conditions, it may economically and advantageously consist of a commercially available molded plastic mesh of classic design, which is less expensive than a true knotted net of the type usually used for fishing.

In FIG. 5, it can also be seen that ballasted bottom 1 has at its four corners, e.g., the corner marked 23, a base 24 constituting a detachable foot fastened for instance onto the bottom by rivet 25. The base consists advantageously of a wear- and skid-resistant material, e.g., molded polyurethane or nylon. The cage feet, which tend to wear out, may thus be replaced when necessary.

With regard to the attachment of cage 2 to bottom 1, sleeve-shaped parts 26 integral with cage 2 correspond to complementary parts 27, likewise hollow and integral with bottom 1. Through parts 26, 27 is engaged a locking pin 28 on each side of the cage.

I claim:

1. A shellfish trap comprising:
   a weighted bottom section having a recess formed therethrough which protrudes outwardly from the plane of the bottom section; and
   a cage section connected to the bottom section and separable therefrom for permitting the trap to be opened, the cage section having a truncated opening therein through which shellfish enter, the truncated opening positioned in space registry with the bottom recess;
   the protruding opening of a first trap being dimensionally similar and engageable with the truncated opening of an adjacently nesting stacked trap;
   wherein the bottom section includes a plurality of openings formed along the edge thereof for receiving concrete blocks therein, the blocks extending outwardly to form wear resistant members, the openings separated by bridge portions having passages formed therein which retain the concrete blocks in place.

2. A shellfish trap comprising:
   a weighted bottom section having a recess formed therethrough which protrudes outwardly from the plane of the bottom section; and
   a cage section connected to the bottom section and separable therefrom for permitting the trap to be opened, the cage section having a truncated opening therein through which shellfish enter, the truncated opening positioned in space registry with the bottom recess;
   the protruding opening of a first trap being dimensionally similar and engageable with the truncated opening of an adjacently nesting stacked trap;
   together with a reducer cone insertable in the truncated opening, the cone having contiguous dual coaxial conical sections and characterized by
   (a) an inlet diameter larger than the smallest diameter of the truncated opening;
   (b) outlet diameter smaller than the smallest diameter of the truncated opening.

3. A shellfish trap comprising:
   a weighted bottom section having a recess formed therethrough which protrudes outwardly from the plane of the bottom section; and
   a cage section connected to the bottom section and separable therefrom for permitting the trap to be opened, the cage section having a truncated opening therein through which shellfish enter, the truncated opening positioned in space registry with the bottom recess;
   the protruding opening of a first trap being dimensionally similar and engageable with the truncated opening of an adjacently nesting stacked trap;
   further comprising hinge means formed on the cage and bottom sections; and
   hollow rod means engageable with the hinge means for completing a hinge structure for the trap; and
   flexible means received in the rod means for preventing misplacement of the cage and bottom sections.

4. The trap structure set forth in claim 1 together with a reducer cone insertable in the truncated opening, the cone having contiguous dual coaxial conical sections and characterized by
   (a) an inlet diameter larger than the smallest diameter of the truncated opening;
   (b) outlet diameter smaller than the smallest diameter of the truncated opening.

5. The trap structure set forth in claim 4 together with hinge means formed on the cage and bottom sections; and
   hollow rod means engageable with the hinge means for completing a hinge structure for the trap; and
   flexible means received in the rod means for preventing misplacement of the cage and bottom sections.

6. The trap structure set forth in claim 4 together with:
   a net covering the cage section, the cage section having recesses formed therein; and
   means located in the recesses for securing the net to the cage, the recesses protecting the securing means from wear.

* * * * *